(12) United States Patent
Baker

(10) Patent No.: US 12,000,534 B1
(45) Date of Patent: Jun. 4, 2024

(54) OIL CHANGE KIT

(71) Applicant: Pool Protector LLC, Oklahoma City, OK (US)

(72) Inventor: Joe Baker, Oklahoma City, OK (US)

(73) Assignee: Pool Protector LLC, Oklahoma City, OK (US)

( * ) Notice: Subject to any disclaimer, the term of this patent is extended or adjusted under 35 U.S.C. 154(b) by 461 days.

(21) Appl. No.: 16/654,939

(22) Filed: Oct. 16, 2019

(51) Int. Cl.
| | |
|---|---|
| *F16N 31/00* | (2006.01) |
| *B65D 1/26* | (2006.01) |
| *B65D 25/32* | (2006.01) |
| *B65D 25/48* | (2006.01) |
| *F16N 37/00* | (2006.01) |

(52) U.S. Cl.
CPC ............. *F16N 31/002* (2013.01); *B65D 1/26* (2013.01); *B65D 25/32* (2013.01); *B65D 25/48* (2013.01); *F16N 37/00* (2013.01)

(58) Field of Classification Search
CPC .......... B65D 25/32; B65D 25/48; B65D 1/26; B67C 2011/022; F16N 31/00; F16N 31/002; F16N 31/004; F16N 31/006
See application file for complete search history.

(56) References Cited

U.S. PATENT DOCUMENTS

| | | | |
|---|---|---|---|
| 1,342,807 A | 6/1920 | Harrington | |
| 1,460,484 A | 7/1922 | Harrington | |
| 3,308,840 A * | 3/1967 | Kelley | F01M 11/04 134/167 R |
| 4,099,598 A * | 7/1978 | Clinard | F16N 31/002 141/313 |
| 4,114,660 A | 9/1978 | Arruda | |
| 4,274,645 A * | 6/1981 | Ferguson | F16N 31/004 184/1.5 |
| 4,775,067 A * | 10/1988 | Mount | B65D 25/00 137/312 |
| 5,143,178 A * | 9/1992 | Latham, Jr. | F16N 31/002 141/340 |
| 5,183,280 A | 2/1993 | Gresch | |
| 5,190,085 A | 3/1993 | Dietzen | |
| 5,375,862 A | 12/1994 | Sirianno | |
| 5,402,837 A | 4/1995 | Dietzen | |

(Continued)

FOREIGN PATENT DOCUMENTS

| | | |
|---|---|---|
| CN | 105972423 A | 9/2016 |
| CN | 107269345 A | 10/2017 |

(Continued)

*Primary Examiner* — Nicolas A Arnett
(74) *Attorney, Agent, or Firm* — Mary M. Lee

(57) ABSTRACT

A kit for changing the engine oil in a vehicle. The kit may include a bucket for collecting the spent oil. The kit may also include a dolly for rolling the bucket underneath the vehicle, and a collapsible stand for elevating the bucket to transfer the dirty oil to a recycling container. A spigot at the bottom of the bucket allows for draining the dirty oil into the recycling container. The bottom of the bucket is inclined toward the spigot, and the inner edge of the bottom is beveled to ensure complete emptying of the oil. The kit may include a hook for hanging the used oil filter to drain in the bucket. A magnet on the lid may be included to mount a wrench or other tools for easy access during the oil change procedure. A handle on the bucket and a leak-proof lid may complete the kit.

18 Claims, 15 Drawing Sheets

(56) References Cited

U.S. PATENT DOCUMENTS

| | | | | |
|---|---|---|---|---|
| 5,472,220 | A | | 12/1995 | Stephan |
| 5,489,042 | A | * | 2/1996 | Ewald .................... B01D 41/04 |
| | | | | 141/364 |
| 5,531,351 | A | * | 7/1996 | Logsdon ................ B67C 11/02 |
| | | | | 220/571.1 |
| 5,653,271 | A | * | 8/1997 | Brittain ................ B09B 3/0058 |
| | | | | 141/106 |
| 5,785,329 | A | * | 7/1998 | Stanley .................. B62B 3/104 |
| | | | | 141/88 |
| 5,832,810 | A | * | 11/1998 | Brawley, Sr. ....... A47J 37/1271 |
| | | | | 99/408 |
| 5,921,292 | A | * | 7/1999 | Fouts ................. G07F 17/3244 |
| | | | | 141/98 |
| 5,961,006 | A | * | 10/1999 | Dunham ................... F04B 9/14 |
| | | | | 222/530 |
| 8,776,757 | B2 | | 7/2014 | Goerend |
| 10,286,943 | B1 | | 5/2019 | Greenblatt et al. |
| 2020/0062532 | A1 | * | 2/2020 | Rodriguez ........... B65H 49/321 |

FOREIGN PATENT DOCUMENTS

| | | | | |
|---|---|---|---|---|
| FR | 2587441 | A1 | | 3/1987 |
| GB | 2513873 | | * 11/2014 | ............. G01F 23/04 |
| GB | 2506759 | B | 10/2015 | |

* cited by examiner

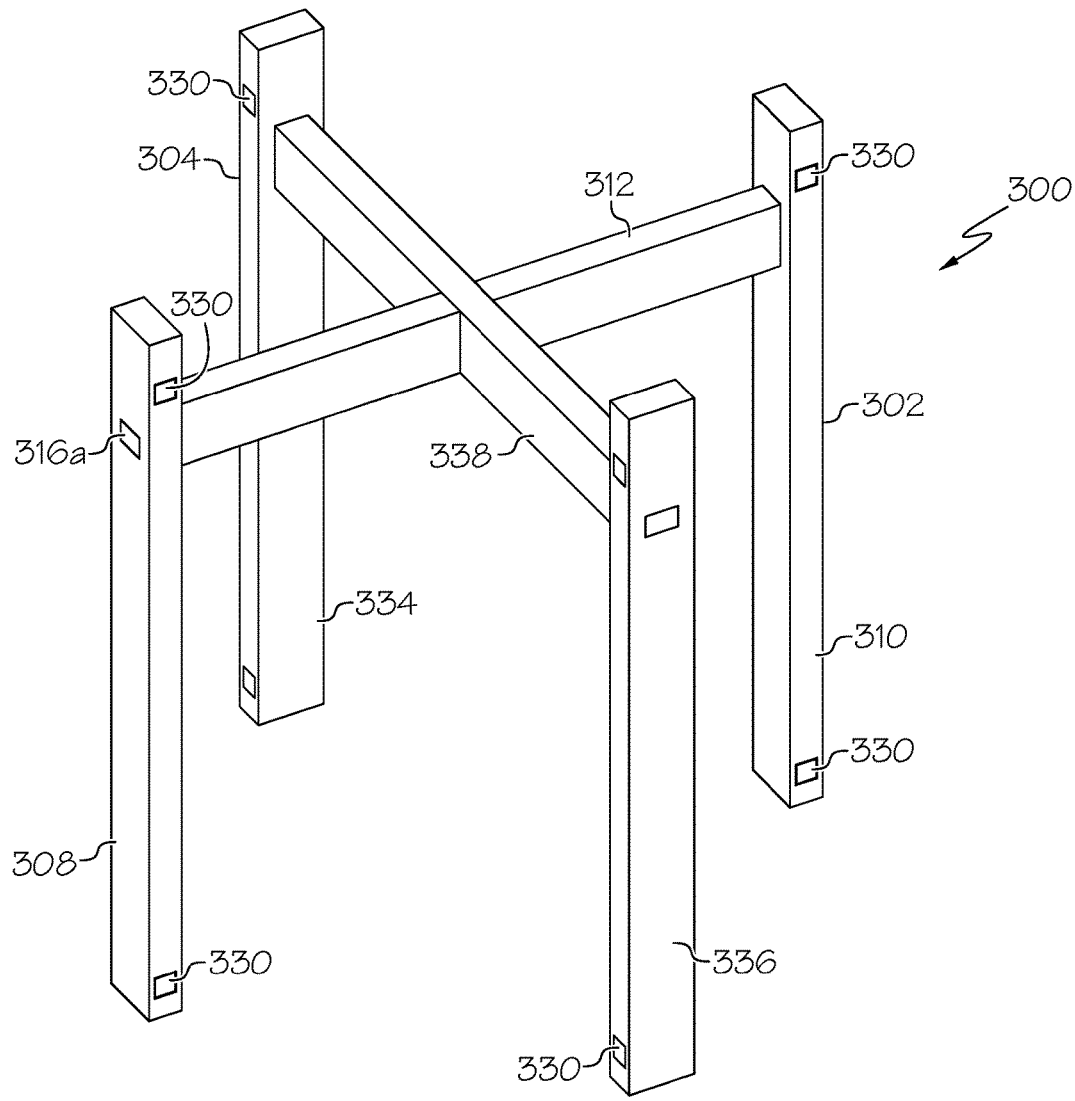
FIG. 17
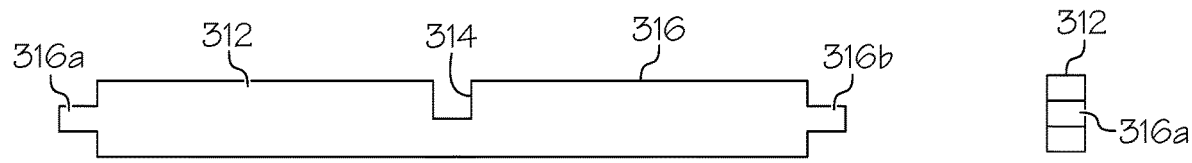
FIG. 18
FIG. 19

OIL CHANGE KIT

FIELD OF THE INVENTION

The present invention relates generally and without limitation to tools and equipment for changing the engine oil in vehicles.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 17 is a front perspective view of the stand of the kit shown in FIG. 1.

FIG. 18 is a side elevational view of the lower cross member of the stand shown in FIG. 17.

FIG. 19 is an end elevational view of the lower cross member shown in FIG. 18.

DETAILED DESCRIPTION OF THE PREFERRED EMBODIMENT(S)

Many car owners like to change the oil in their own vehicles instead of having to take their vehicle to a service shop. While the task is not complicated, it can be messy and requires certain tools. For example, the container used to catch the spent oil needs to be large enough to contain all the oil in the vehicle and yet shaped so that it will fit underneath the oil pan. A wrench may be needed to remove and replace the drain plug on the oil pan or to unscrew the oil filter. Many car owners want to take the spent oil to a recycling center for disposal, which usually involves pouring the spent oil into a used oil carton that typically has a very narrow opening.

The present invention provides a kit for car owners to collect the spent oil from a vehicle and easily transfer it to a recycling carton. Generally, the kit may comprise a bucket sized to accommodate the amount of oil in the vehicle. The bucket may be sized for non-commercial or larger commercial vehicles and trucks. A dolly may be included to roll the bucket under vehicle. The bucket and dolly have a combined height that fits under most non-commercial vehicles. A stand may be included to elevate the bucket for use under vehicles that are elevated or larger commercial vehicles that are higher off the ground.

The bucket includes a spigot for discharging the dirty oil into a container for recycling, such as a used oil carton. The bucket and stand may be sized so that, when the bucket is supported on the stand, the outlet of the spigot is at a height just above the top of a typical quart/1 gallon size oil carton. The kit may include an extension tube for the spigot when the oil is being drained into a smaller 1 quart carton. The stand is collapsible into two similarly shaped stand members, which may include magnets to hold the two members in a stacked position for storage.

Still further, a leak-proof lid may be included to cover the bucket. A magnet on the top of the lid holds a socket wrench and other tools at the ready. The bucket may include a hook for hanging the used oil filter to drain. The bucket, dolly, and collapsed stand fit comfortably on a standard 12-inch shelf for storage. These and other features and advantages of the present invention will become apparent from the following description with reference to the accompanying drawings.

Figure 1:
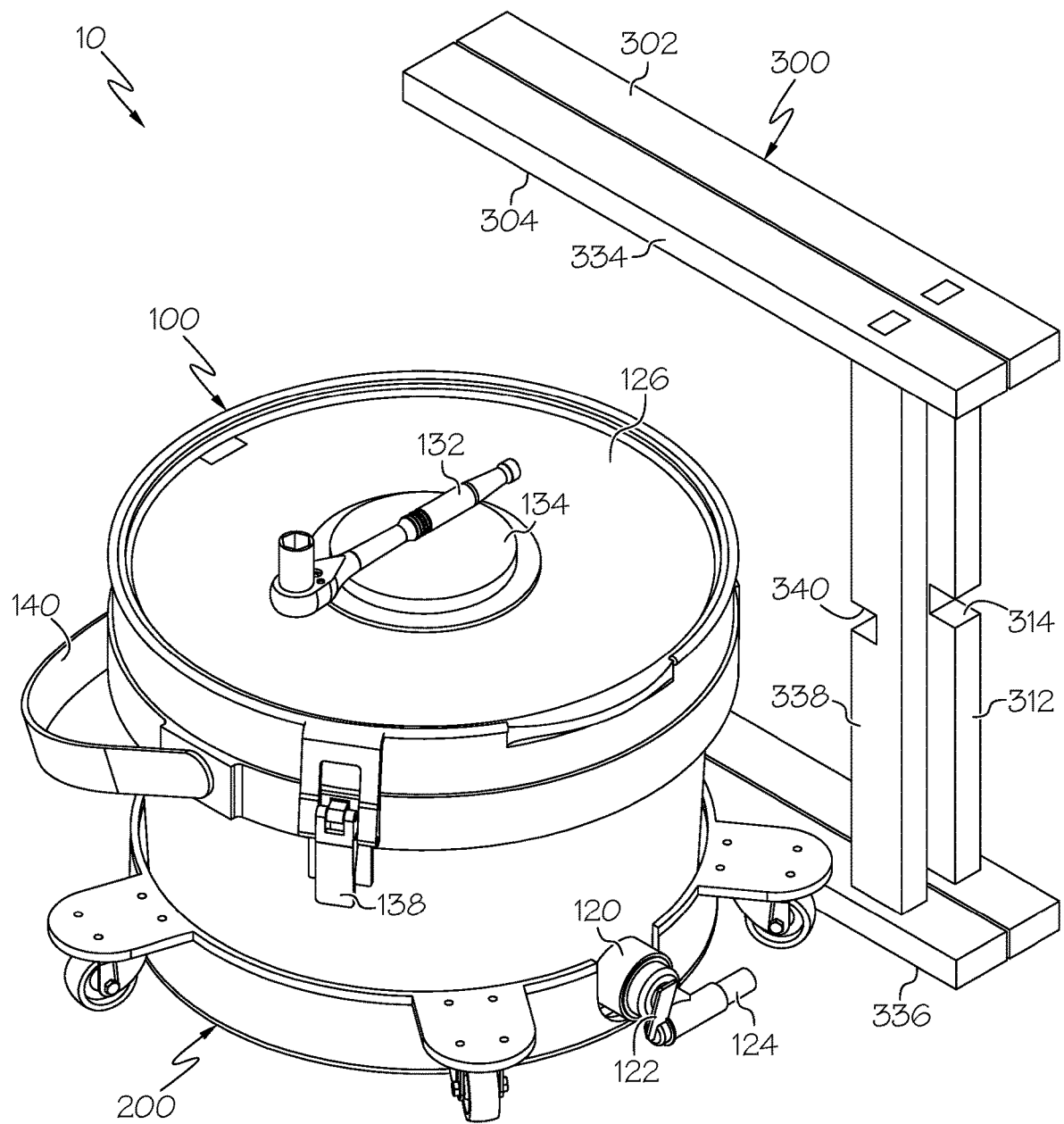
FIG. 1 is a perspective view of the disassembled oil change kit arranged for storage.

Turning now to the drawings in general and to FIG. 1 in particular, there is shown therein an oil change kit made in accordance with a preferred embodiment of the present invention and designated generally by the reference numeral 10. The kit 10 is designed for collecting spent engine oil from the drain pan of a vehicle. The kit 10 may comprise a bucket 100 for collecting the spent oil, a dolly 200 for rollingly supporting the bucket as it is moved in and out from underneath the vehicle, and a stand 300 for supporting the bucket at a convenient height for emptying the spent oil into standard sized used oil cartons for recycling.

Figure 3:
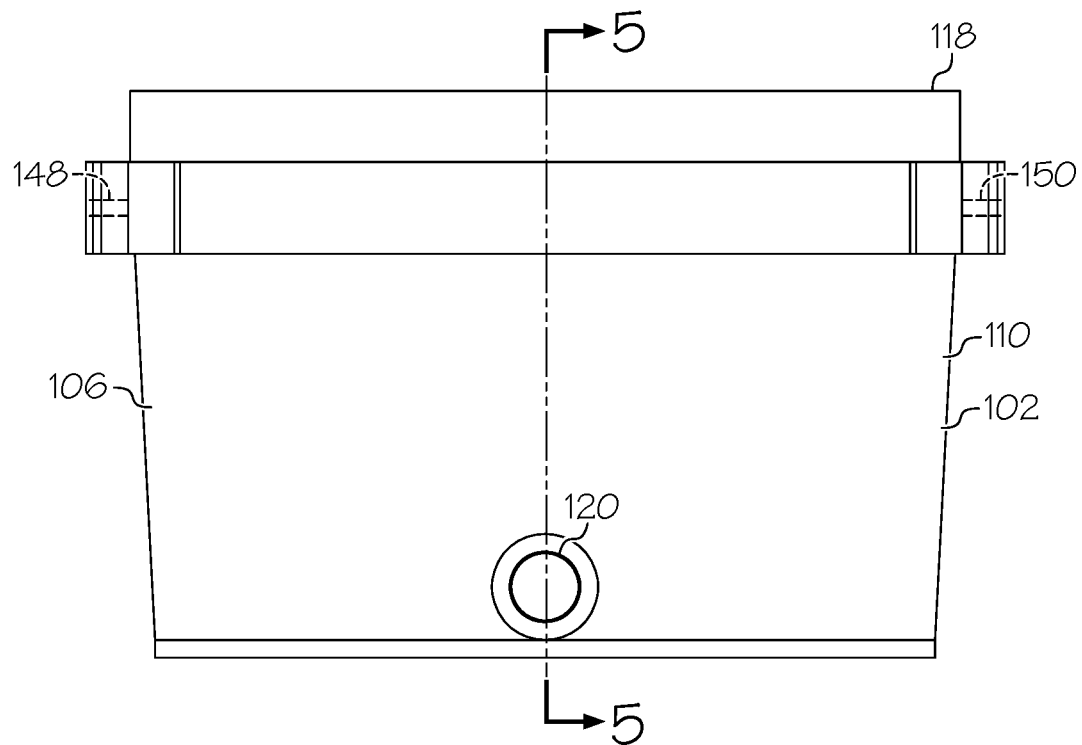
FIG. 3 is a front elevational view of the bucket of the oil change kit of FIG. 1. The lid and spigot have removed to simplify the illustration.
Figure 4:
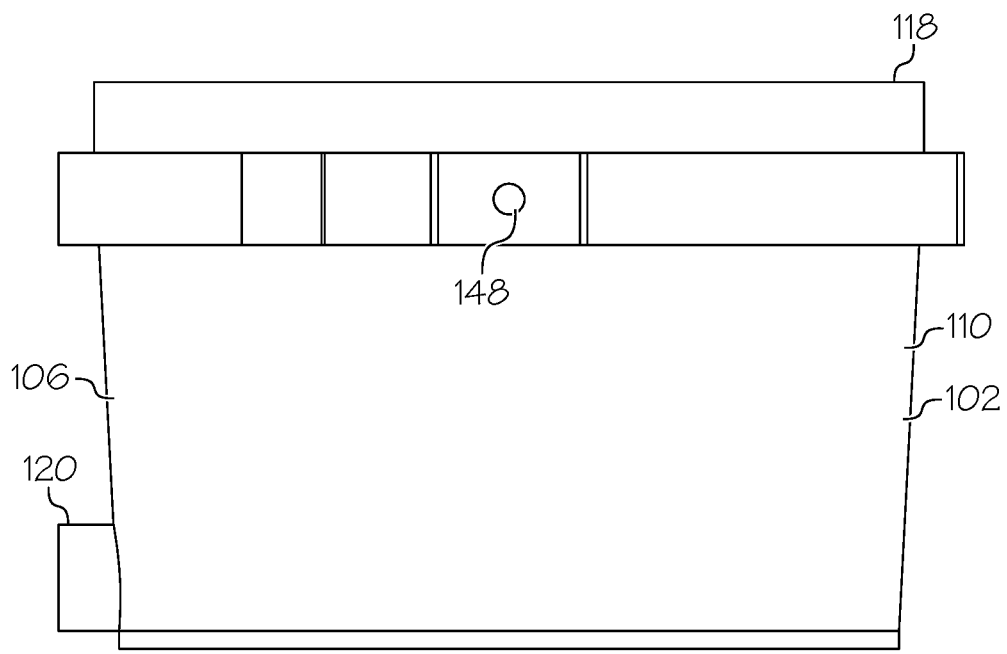
FIG. 4 is a side elevational view of the bucket shown in FIG. 3.

With reference now to FIGS. 2-14, an embodiment of the bucket 100 will be described in more detail. The bucket 100 comprises a body 102, shown in FIGS. 3-5, having a bottom 104 and an upwardly extending sidewall 106 with an inner surface 108 and an outer surface 110. The bottom 104 has an inner surface 112 with a perimeter 114 contiguous to the inner surface 108 of the sidewall 106.

The inner surface 108 of the sidewall 106 and the inner surface 112 of the bottom 104 define an oil receiving space 116 accessed through an open top defined by the upper edge 118 of the sidewall. The capacity of the oil receiving space 116 may vary. In one embodiment, designed primarily for non-commercial vehicles and light trucks, the capacity of the oil receiving space 116 may be between about four (4) and about twelve (12) quarts, and most preferably is at least about six (6) quarts. An ideal size for non-commercial vehicles and light trucks is about ten (10) quarts. For use with larger, commercial vehicles the capacity of the oil receiving space may be between about eight (8) and about twenty-two (24) quarts, and most preferably is at least about twelve (12) quarts. An ideal size for large commercial vehicles is about sixteen (16) quarts.

Figure 5:
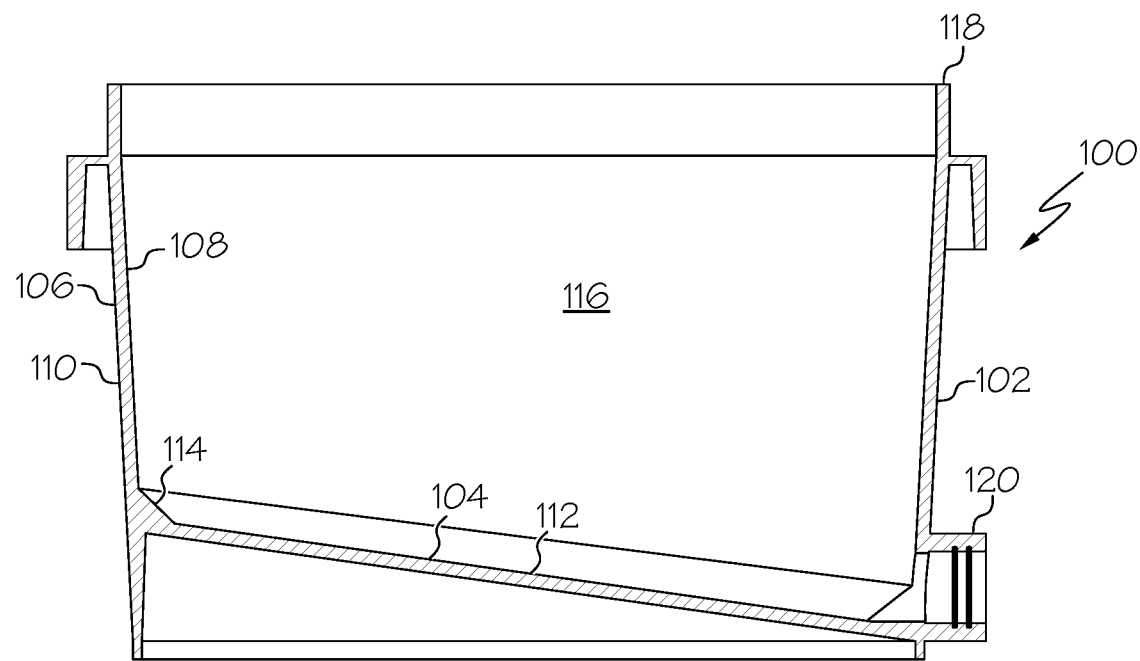
FIG. 5 is a sectional view taken along the line 5-5 in FIG. 3.
Figure 6:
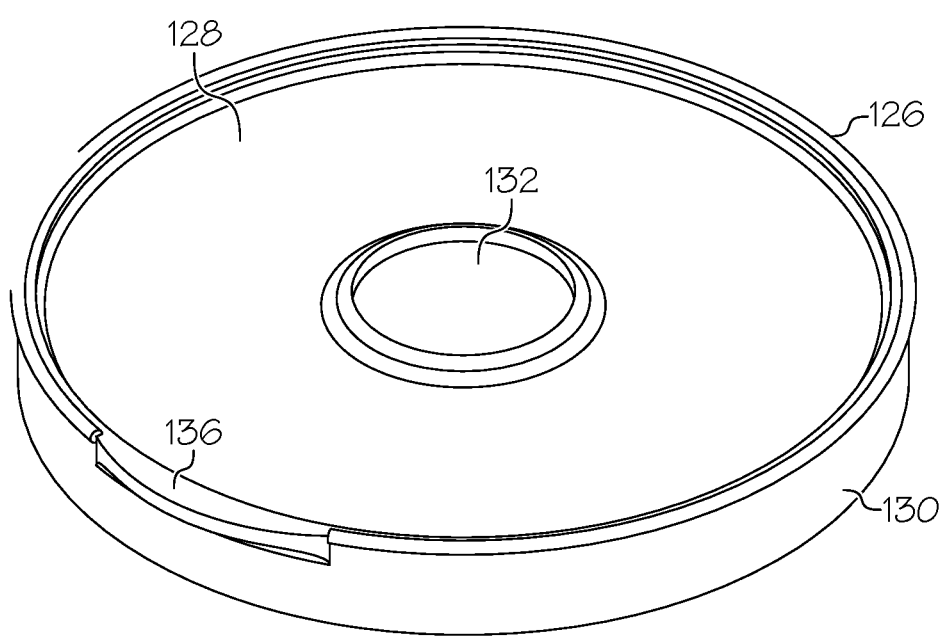
FIG. 6 is a top perspective view of the lid for the bucket shown in FIG. 2.
Figure 7:
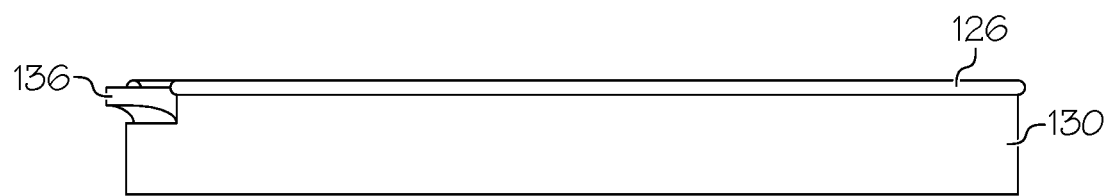
FIG. 7 is a side elevational view of the lid shown in FIG. 6.
Figure 8:
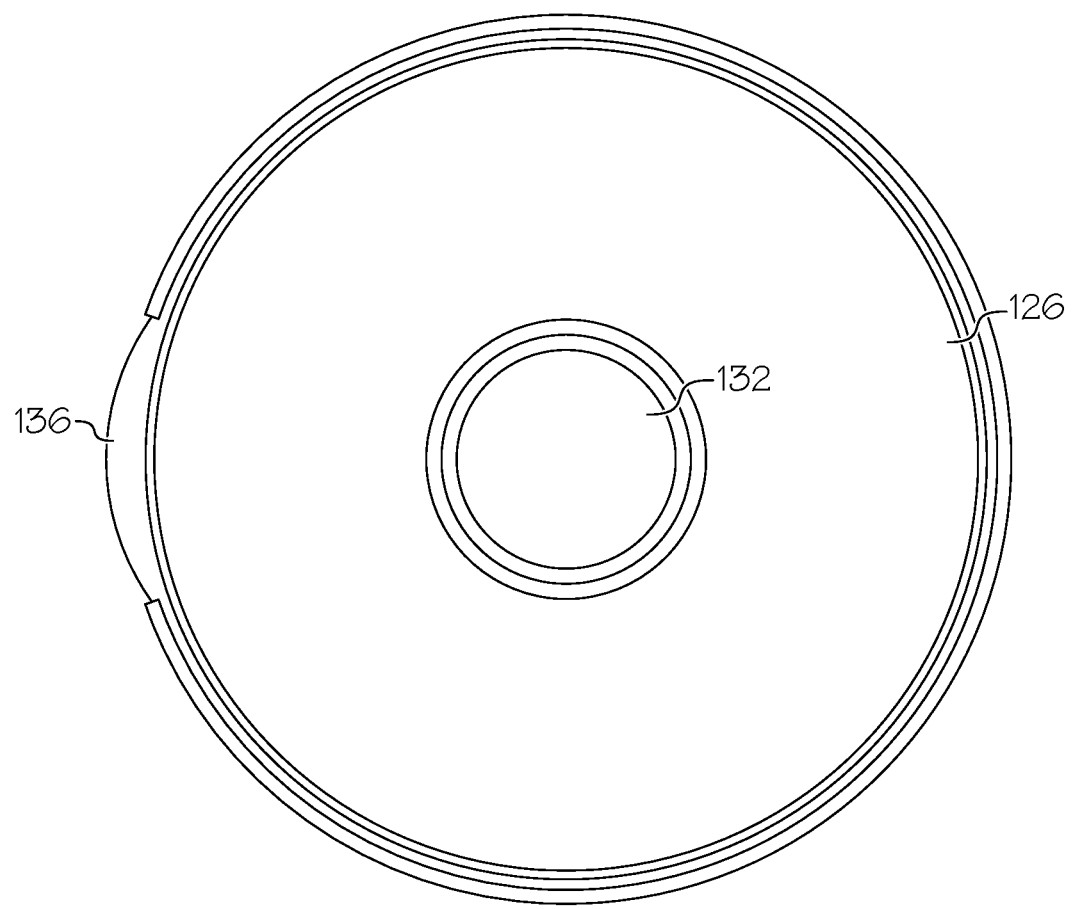
FIG. 8 is a plan view of the lid shown in FIG. 6.
Figure 9:
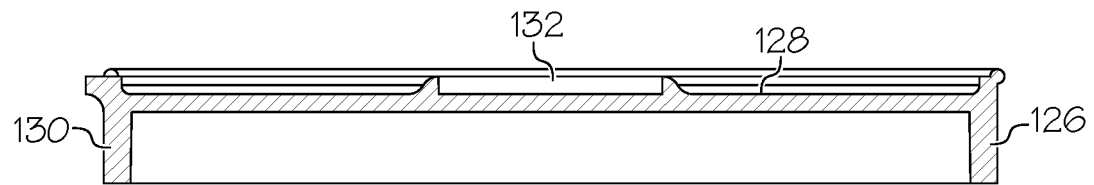
FIG. 9 is a sectional view of the lid shown in FIG. 6.
Figure 10:
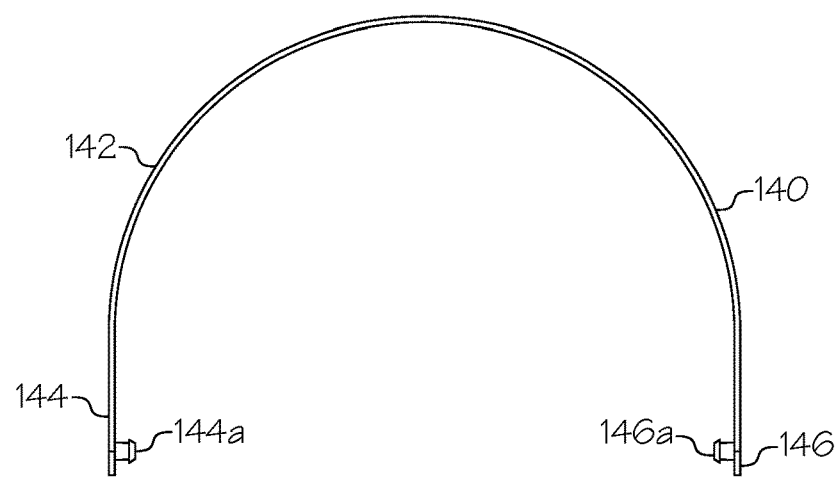
FIG. 10 is a front elevational view of the handle of the bucket shown in FIG. 2.
Figure 11:
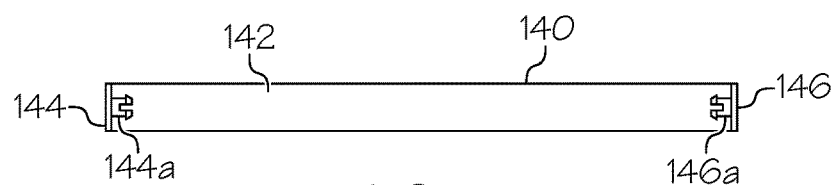
FIG. 11 is a bottom view of the handle shown in FIG. 10.
Figure 12:
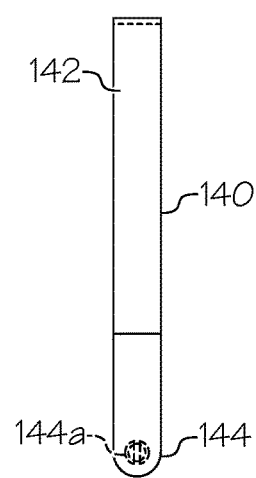
FIG. 12 is a side elevational view of the handle shown in FIG. 10.

The sidewall 106 defines a drain port 120 adjacent the inner surface 112 of the bottom 104. As seen in FIG. 5, the inner surface 112 of the bottom 104 of the bucket body 102 is sloped toward the drain port 120 to facilitate complete emptying of the bucket body through the drain port.

Figure 2:
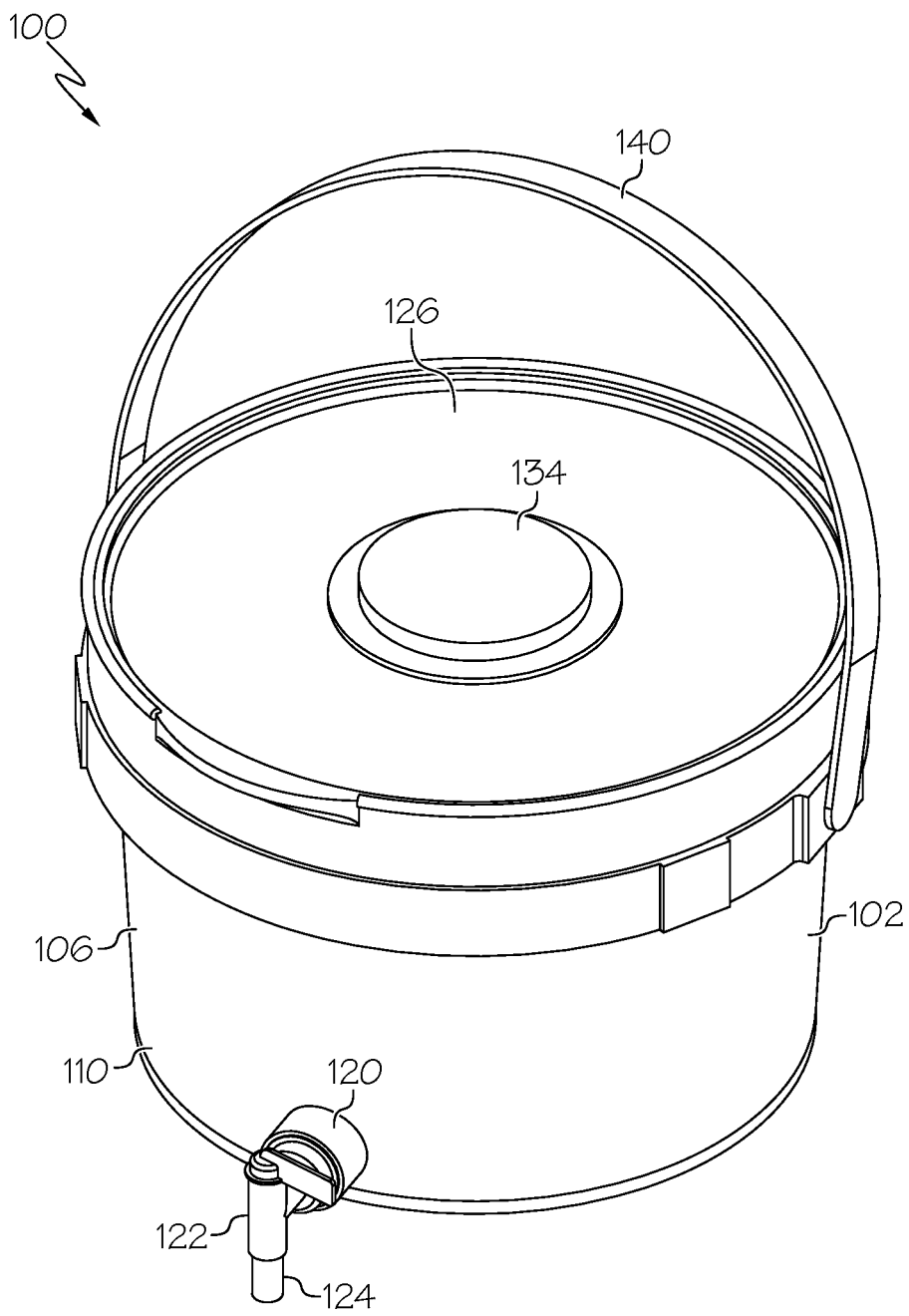
FIG. 2 is a front perspective view of the bucket of the oil change kit of FIG. 1.

As shown in FIG. 2, a spigot 122 may be mounted on the sidewall 106 over the drain port 120 to control the flow of oil therethrough. As used herein, "spigot" means a faucet device comprising an opening continuous with the drain port in the bucket, a valve for controlling the flow of oil through the spigot, and a spout for directing oil out of the spigot. A preferred spigot is the type commonly referred to as a "drum tap" or "drum faucet." One preferred brand of spigot is the polyethylene plastic "anti-glug" drum tap model numbers DIN 51, DIN 61, and DIN 71, made by ScopeNext Ltd. (Worcester, England) and ScopeNext, Inc. (Lake Wales, Florida). Conveniently, this spigot is rotatable between a stowed position (FIG. 1) and a use position (FIG. 2). As seen in FIG. 1, when the spigot 122 is in the stowed position, it is rotated so that the spout 124 extends horizontally. As seen in FIG. 2, when the spigot 122 is in the use position, it is positioned so that the spout 124 extends downwardly or vertically.

In most instances, it is desirable to include a lid for the bucket 100. One embodiment of a suitable lid is shown in FIGS. 6-9. The lid, designated generally by the reference number 126 may include a generally flat portion 128 with a downwardly extending flange 130 configured to sealingly engage the upper edge 118 of the bucket body 102. The lid 126 may be formed with a central portion 132 configured to receive a permanent magnet 134 (FIGS. 1&2). For example, in one embodiment the magnet 134 is a disk-shaped or annular rare earth magnet encased in a rubber cover, which can be glued or otherwise affixed to the lid on the central portion 130. The magnet 134 provides a convenient way to removably attach one or more tools, such as the socket wrench 132, illustrated in FIG. 1. The lid 126 may include a lift tab 136 for facilitating removal of the lid. Still further, the lid 126 may include a latch or other device for securing the lid to the bucket 100. This will prevent spillage in the event there is a need to transport the bucket with oil in it. For example, one or more toggle latches 138 (FIG. 1) may be used.

The bucket 100 may also include a handle. A loop-style handle is ideal and one illustrative example is shown in FIGS. 1, 2, and 10-12. The handle 140 may include a flexible strap 142 with first and second ends 144 and 146 rotatably attached to the outer surface 110 of the bucket sidewall 106. To that end, each of the first and second ends 144 and 146 may include an inwardly extending stud 144a and 146a. The outer surface 110 of the bucket sidewall 106 may be formed with sockets 148 and 150, shown in FIGS. 3 and 4, sized to receive the studs 144a and 146a. In this way, the handle 140 is positionable in either a lift position arched over the bucket body 102, as seen in FIG. 2, or a use and storage position, as shown in FIG. 1, hanging at the side of the bucket body 102.

Figure 13:
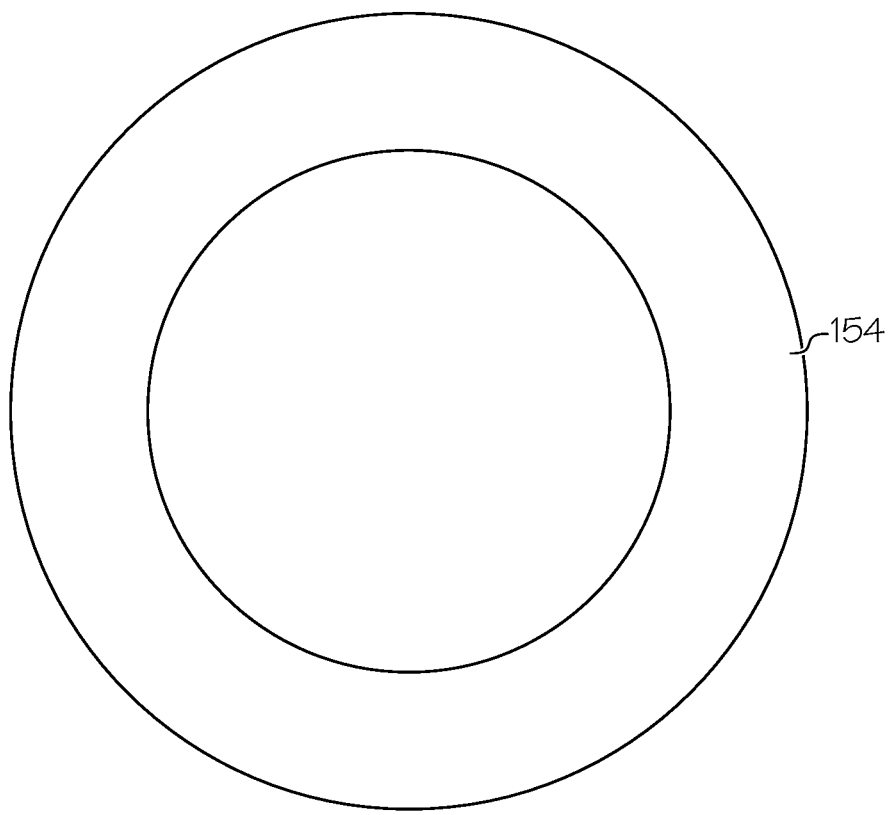
FIG. 13 is a plan view of a washer for the bucket shown in FIG. 2.
Figure 14:
FIG. 14 is a side elevational view of the washer shown in FIG. 13.

FIGS. 13 and 14 illustrate a washer 154 that may be included. The washer 154 facilitates a leak proof seal between the lid 126 and the upper edge 118 of the sidewall 106 of the bucket body 102. The washer 154 may be affixed to the underneath surface of the lid 126 in a suitable manner, such as by glue or other adhesive.

Figure 15:
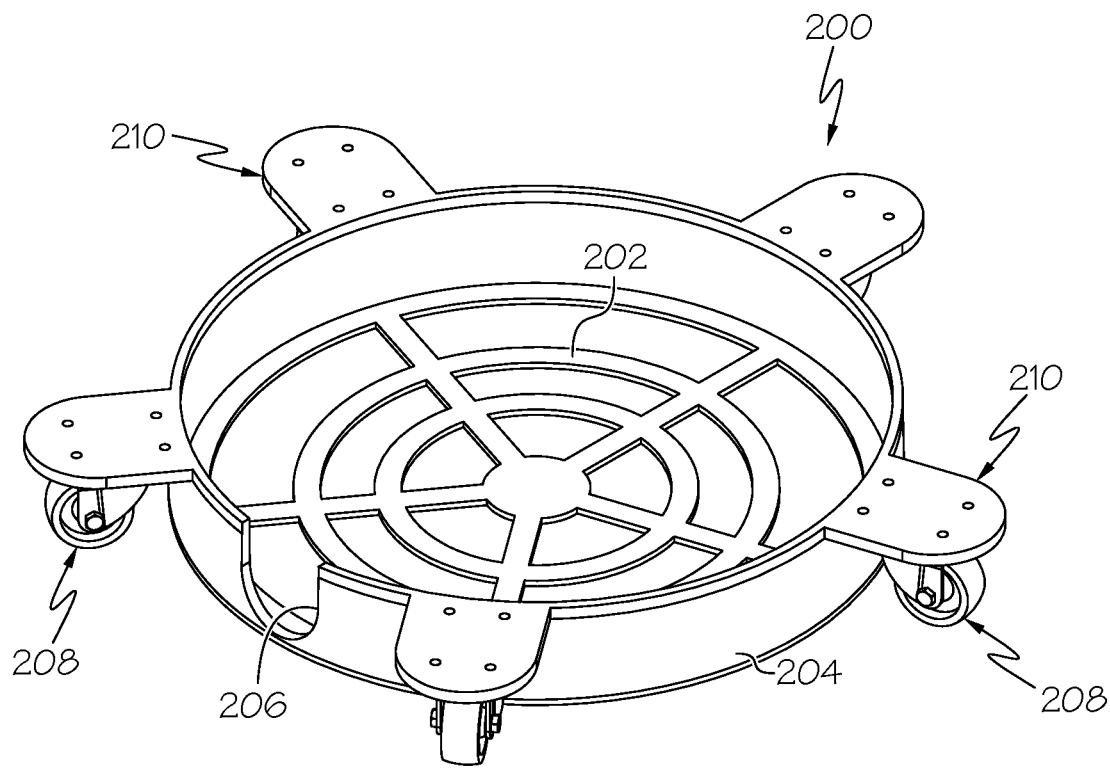
FIG. 15 is a front perspective view of the dolly of the kit shown in FIG. 1.
Figure 16:
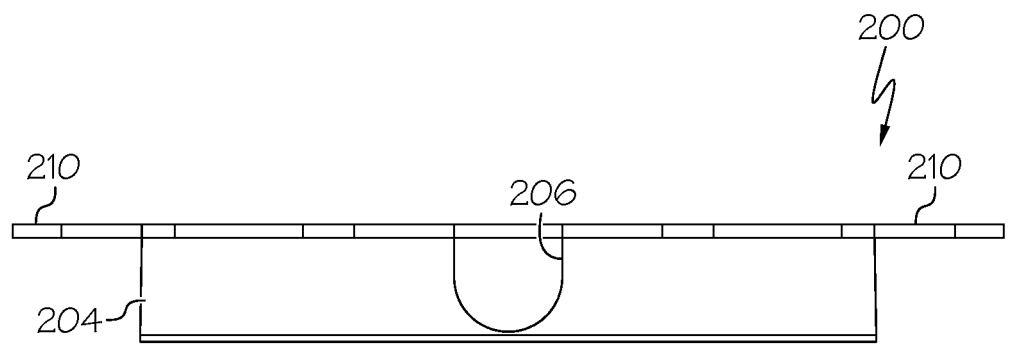
FIG. 16 is a side elevational view of the dolly shown in FIG. 15.

Turning now to FIGS. 15 and 16, an exemplary dolly 200 will be described. The dolly 200 is configured to rollingly support the bucket 100 in an upright position, as seen in FIG. 1. (See also FIG. 25) Accordingly, the dolly 200 may include a broad flat support surface 202. The support surface 202 may be solid or perforated as shown in FIG. 15. A perforated or cut-out surface provides lightweight support without allowing oil or debris to collect. To provide a secure recess for the bucket 100, the dolly 200 may include an upwardly extending flange 204. To accommodate the spigot 122 (FIGS. 1&2), the flange 204 may include a notch 206.

The dolly 200 may be equipped with rollers of some type, such as the low-profile castors designated collectively at 208, as shown in FIG. 15. In the illustrated embodiment, the dolly 200 includes five (5) castors 208 arranged circumferentially at the perimeter of the support surface 202. More specifically, without limitation, the castors 208 may be attachable to tabs 210 extending radially from the upper edge 210 of the flange 204. The number, type, position, and means of attachment for the rollers may vary. The configuration of the dolly and the use of low-profile castors minimize the height of the bucket and dolly combined.

Figure 26:
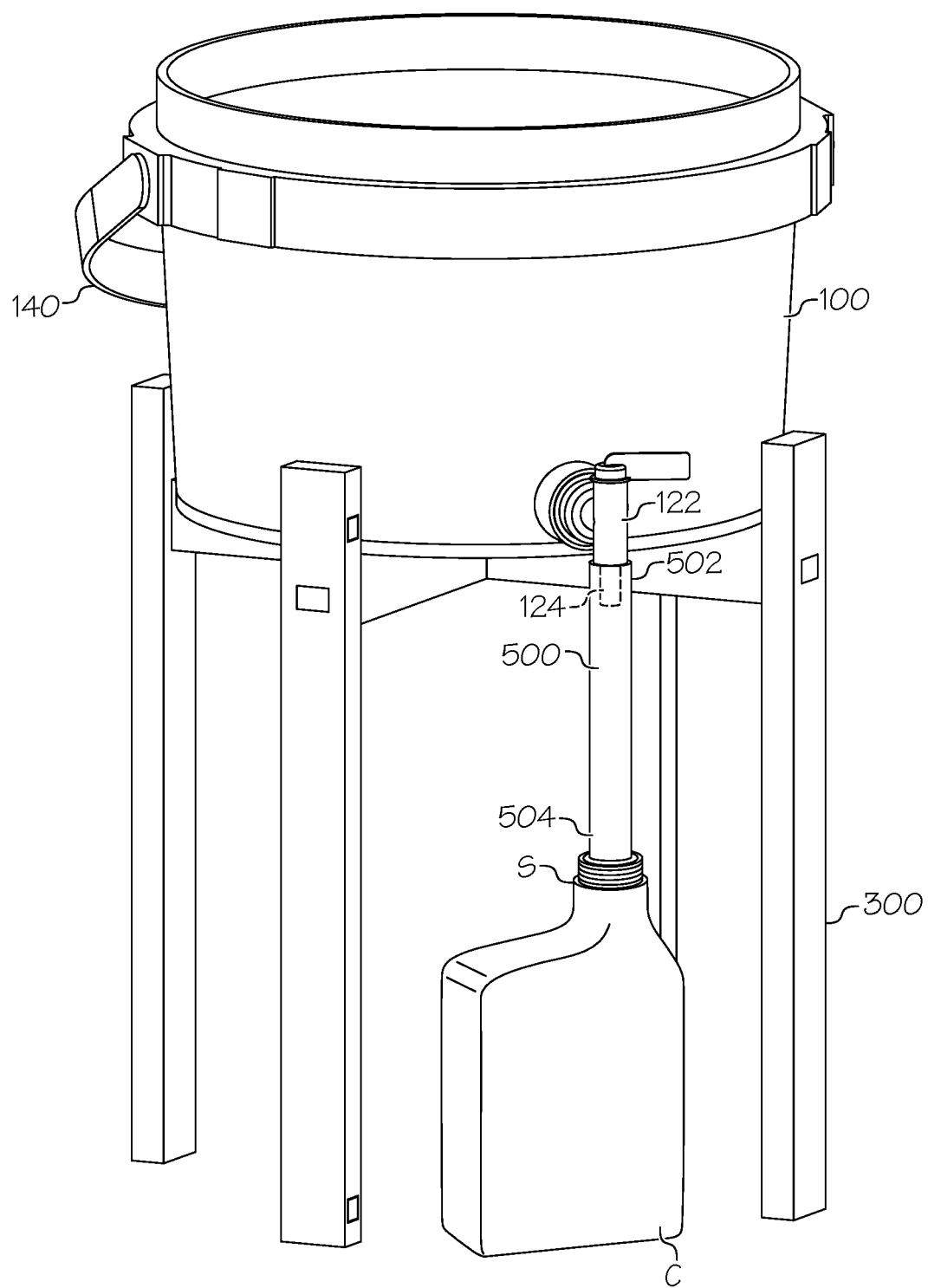
FIG. 26 is a front perspective view of the open bucket supported on the stand for use in a second drainage position. The spigot is rotated to the open or discharge position and an extension tube is attached to the outlet of the spigot for use with a standard one (1) quart oil carton.

With reference now to FIGS. 17-23, a preferred stand 300 will be explained. As shown in FIG. 26, the stand 300 is configured to support the bucket 100 in an upright position a distance above a working surface to facilitate the drainage of the dirty oil into containers for recycling. As used herein, "working surface" refers to the ground or floor or other surface on which the vehicle is supported, such as a garage floor or driveway, for example.

The structure and configuration of the stand 300 may vary widely. Although not essential, it is advantageous for the stand 300 to be collapsible for compact storage. To that end, the stand 300 may comprise a pair of inverted U-shaped support members 302 and 304. The support member 302 is shown in its component parts in FIGS. 18-23. As it is nearly identical to the member 304, only the member 302 is shown and described in detail.

Figure 20:
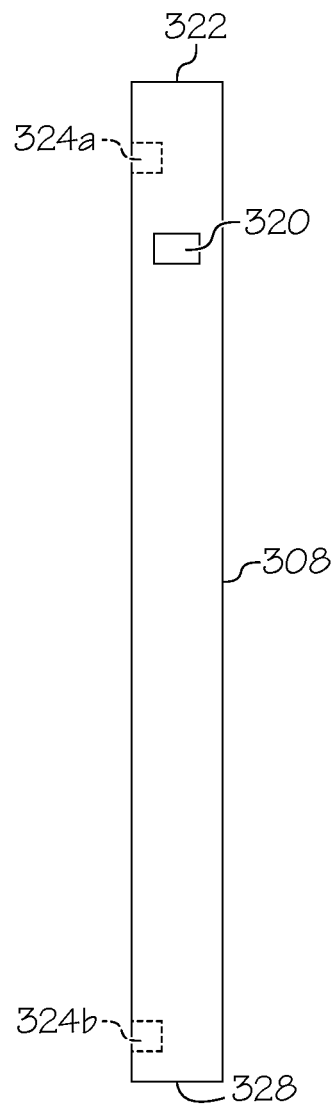
FIG. 20 is a front elevational view of one of the leg members of the stand shown in FIG. 17.
Figure 21:
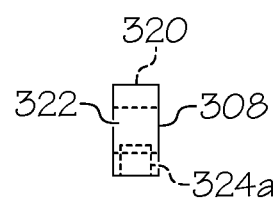
FIG. 21 is a plan view of the leg member shown in FIG. 20.
Figure 22:
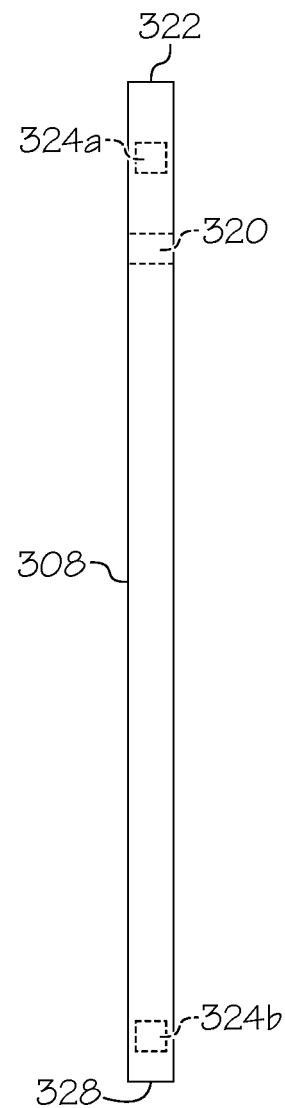
FIG. 22 is a side elevational view of the leg member shown in FIG. 20.
Figure 23:
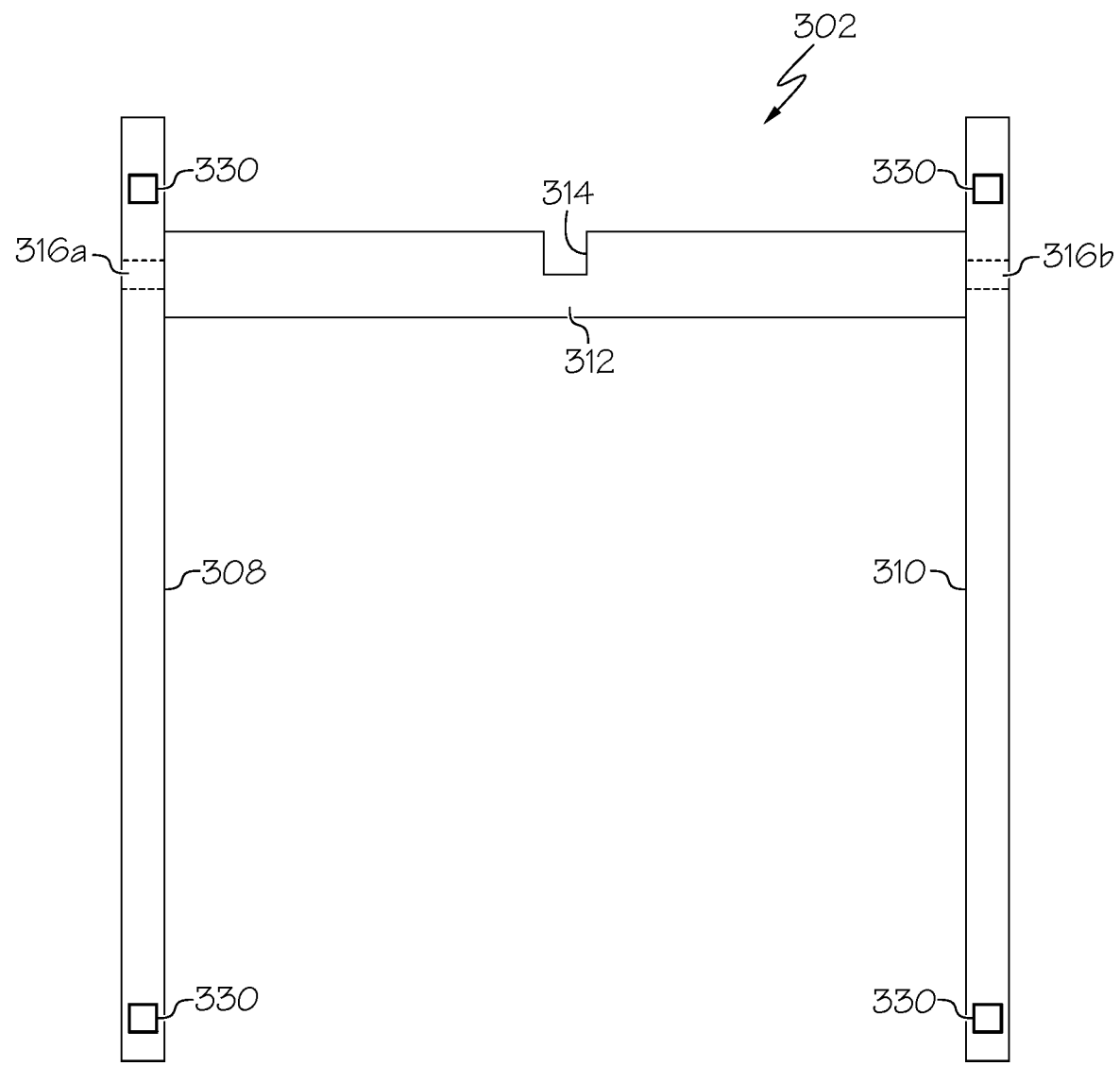
FIG. 23 is a front elevational view of one of the two stand members of the stand shown in FIG. 17.

The support member 302 comprises a pair of vertical legs 308 and 310 and a cross member 312. The cross member 312 includes a notch 314 on its upper edge 316 and extension tabs 316a and 316b on each end. The legs 308 and 310 are identically formed, so only the leg 308 is shown in FIGS. 20-22. The leg 308 includes a recess 320 near its top end 322, the recess being sized to receive the tab 316a.

The leg 308 also includes one or more magnets. For example, the leg 308 may be formed with magnet sockets 324a and 324b near the top and bottom ends 322 and 328, respectively. Small permanent magnets (FIGS. 17&23), designated collectively at 330, may be inserted in the sockets 324a and 324b and secured by gluing, for example.

With continued reference to FIG. 17 and also to FIG. 1, it now will be understood, that the support member 304 likewise includes a pair of vertical legs 334 and 336 and a cross member 338. The member 304 differs from the member 302 in that the notch 340 (FIG. 1) in the cross member 338 is in the bottom edge so that the cross member 338 is engageable with the cross member 312 of the support member 302 to form the assembled stand 300 in the operating position, as shown in FIG. 17. The stand 300 is easily disassembled by simply lifting the support member 304 off the support member 302. It now also will be apparent that the magnets 330 will hold the separated support members 302 and 304 in a collapsed or stacked face-to-face position, as seen in FIG. 1, for transport and storage of the kit 10.

Figure 24:
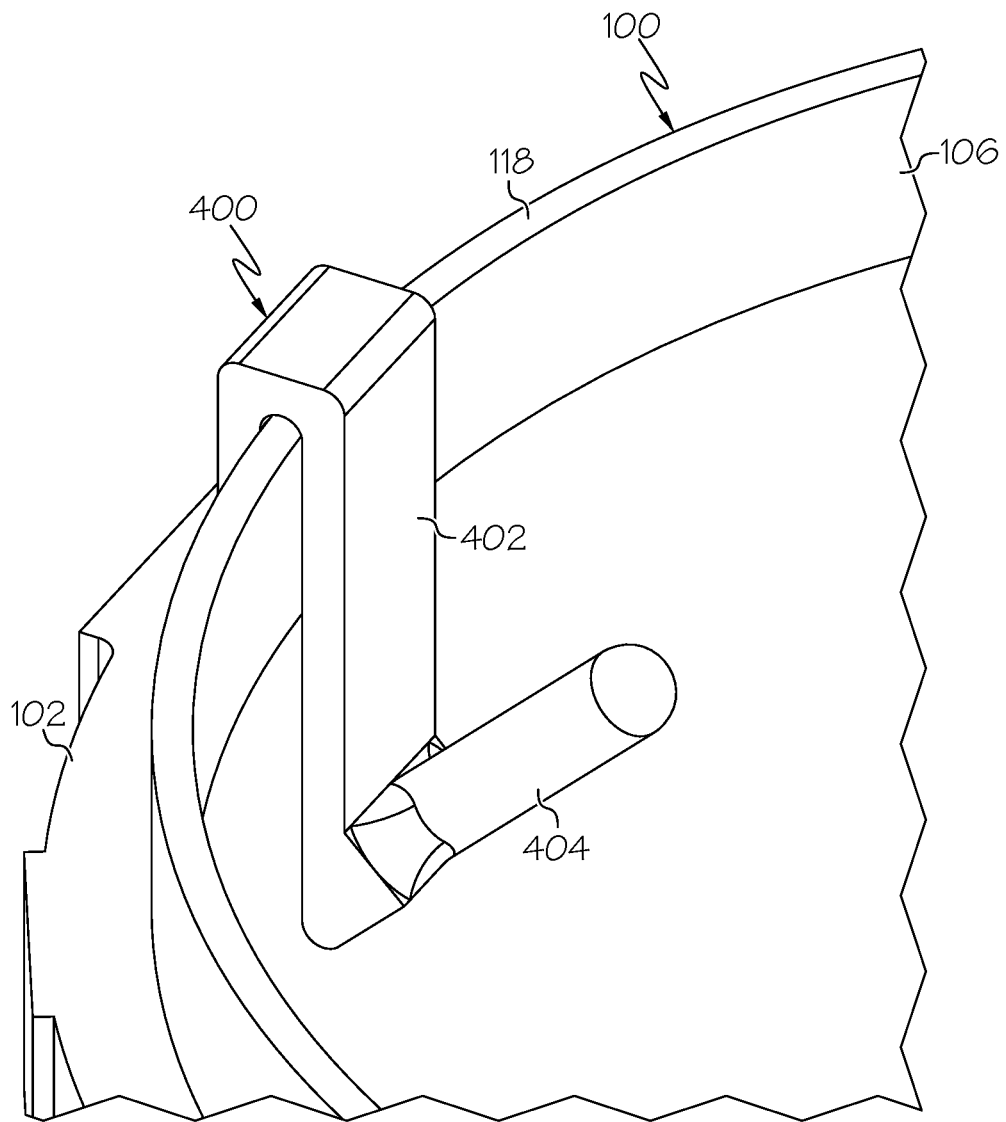
FIG. 24 is an enlarged, fragmented perspective view of the open bucket of the kit of FIG. 1 showing the use of an optional hook for supporting an oil filter inside the bucket.

Another optional but desirable feature of the inventive kit is illustrated in FIG. 24. The oil filter is typically changed each time the oil in the vehicle is replaced. When the filter is removed, it is saturated with oil which drips on the working surface and surroundings. The kit 10 of the present invention may include a hook 400 positioned to support the filter (not shown) inside the bucket 100 as it drains. Although the structure of the hook 400 may vary, in one embodiment the hook includes a hanger portion 402 configured to hang on the upper edge 118 of the bucket sidewall 106. Extending upwardly from the bottom 404 of the hanger portion 402 is a rod or pin 404 sized to be inserted into the central bore of the filter cartridge. This will support the filter while the oil drains into the bucket 100. The filter hook 400 is simply removed from the edge 118 and placed inside the empty bucket 100 for storage.

Having described the various parts of the kit 10, its use now will be explained with reference to FIGS. 25 and 26. For most non-commercial vehicles and light trucks, the open bucket 100 will be placed in the dolly 200 and, with the spigot 122 rotated horizontally, the bucket is rolled underneath or otherwise positioned under the oil pan of the vehicle (not shown). Using the wrench 132 if necessary, the drain plug is removed and the oil is released into the bucket 100.

In most instances, prior to the changing the oil, the vehicle will be elevated several inches using the car's jack or a set of car ramps. This provides more room for the individual to reach under the car. Also, the height of the collection receptacle should allow enough distance between the top of the receptacle and the bottom of the oil pan to allow the individual to reach in and remove the oil plug. To that end, the bucket 100 and the dolly 200 of the inventive kit preferably are configured so that, when the bucket is supported in the dolly, the bucket and dolly have a combined height that will place the open bucket at least about four (4) inches below the bottom of the oil pan of the vehicle when the vehicle is elevated. For example, for use with non-commercial vehicles and light trucks, the combined height of the bucket 100 and the dolly 200 preferably is no greater than about sixteen (16) inches. For example, the combined height of the bucket 100 and the dolly 200 may be between about six (6) inches and about fifteen (15) inches and most preferably is about eight (8) and about ten (10) inches.

When the oil pan is empty, the bucket 100 is removed from the dolly 200 and placed in the assembled stand 300, as shown in FIG. 26. If desired, the oil filter can be supported on the hook 400 inside the bucket 100 to drain the oil from the filter. A used oil carton "C" is placed under the spigot 122, and the spigot is rotated to the downward or discharge position. Then, the spigot 122 is opened and the oil is allowed to drain from the bucket 100 into the carton C.

The stand 300, the bucket 100, and the spigot 122 desirably are cooperatively configured so that, when the stand is positioned on the working surface and the bucket is supported on the stand, the end of the spout 124 on the spigot is only slightly above the spout on a typical large size (4-5 quart) oil carton (not shown). To that end, the stand 300, the bucket 100, and the spigot 122 are cooperatively configured so that, when the stand is positioned on the working surface and the bucket is supported on the stand, the end of the spout 124 on the spigot is about twelve (12) to about fourteen (14) inches above the working surface.

As illustrated in FIG. 26, when a small or one-quart size oil carton C is positioned on the working surface adjacent the stand 300, the open spout S of the carton is several inches lower than the spout 124 of the spigot 122. To prevent spills while the bucket 100 is emptied of oil, the kit 10 may further include an extension tube 500. The extension tube 500 has a first end 502 sized to receive the spout 124 on the spigot 122 and a second end 504 sized to reach into or near the spout S of the carton C.

Accordingly, the stand 300, the bucket 100, the spigot 22, and the extension tube 500 preferably are cooperatively configured so that, when the stand is positioned on a working surface, the bucket is supported on the stand, and the first end of the extension tube is on the spout 124 of the spigot, the second end 504 of the extension tube is about eight (8) inches above the working surface. The extension tube 500 is conveniently stored inside the empty bucket with the oil filter hook 400 when the kit 10 is not in use.

For larger commercial vehicles, and depending on how high the oil pan is from the working surface, the bucket 100 may be supported on the stand 300 so that the bucket is closer to the oil pan draining. Furthermore, as indicated, for commercial vehicles with larger oil pans, the bucket 100 will be larger as well.

Figure 25:
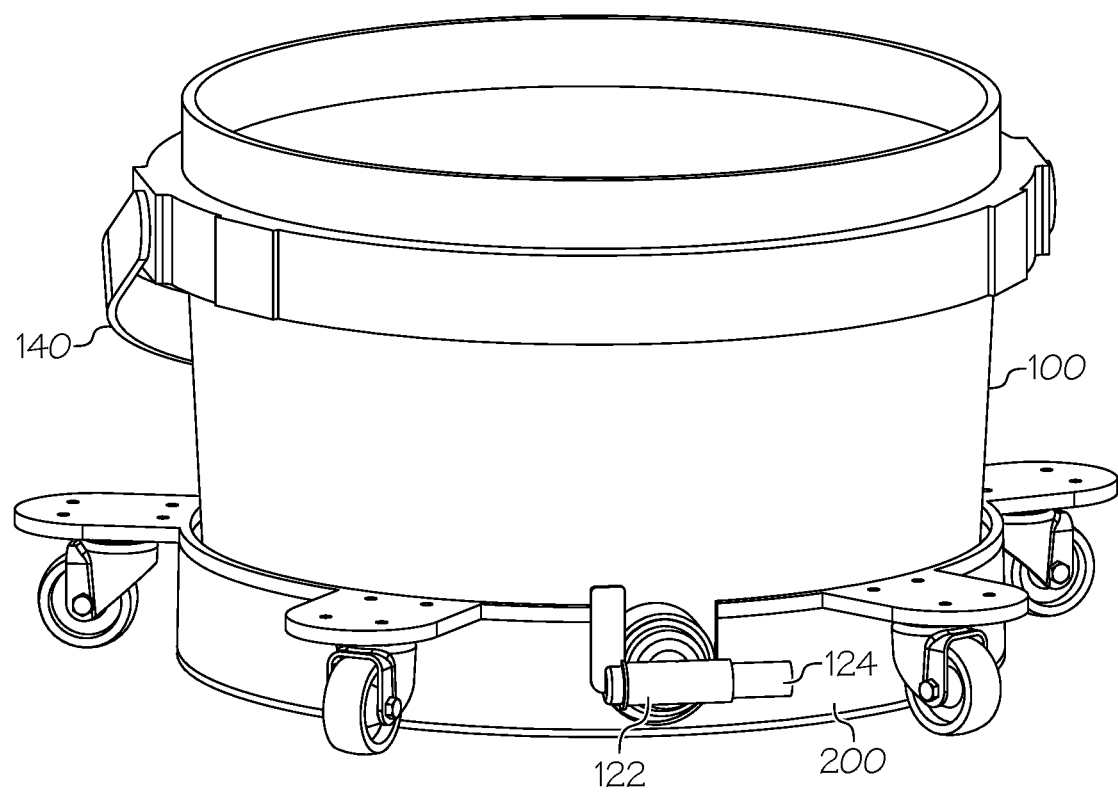
FIG. 25 is a front perspective view of the open bucket supported on the dolly in a first drainage position. The spigot is rotated to the closed or side position.

For the purpose of this description, the words left, right, front, rear, top, bottom, inside and outside, upwardly and downwardly, may be used to describe the various parts and directions of the invention as depicted in FIGS. 25 and 26. These descriptive terms should not be considered as limiting of the possible orientations of the invention or how it may be used. The terms are merely used to describe the various parts and directions so they may be readily understood and located in the drawings.

The embodiments shown and described above are exemplary. Unless otherwise expressly stated herein, each element shown and described is optional. Many details are often found in the art and, therefore, many such details are neither shown nor described herein. It is not claimed that all of the details, parts, elements, or steps described and shown herein are newly invented. Changes may be made in the details, especially in matters of shape, size, and arrangement of the parts, within the principles of the invention to the full extent indicated by the broad meaning of the terms in the attached claims.

The description and drawings of the specific embodiments herein do not point out what an infringement of this patent would be, but rather provide non-limiting examples of how to use and make the invention. Likewise, the abstract is neither intended to define the invention, which is measured by the claims, nor is it intended to be limiting as to the scope of the invention in any way. The limits of the invention and the bounds of the patent protection are measured by and defined in the following claims.

What is claimed is:

1. A kit for collecting spent engine oil from a vehicle supported on a working surface, the kit comprising:
   a bucket comprising a body with a bottom and an upwardly extending sidewall with an inner surface and an outer surface, wherein the bottom has an inner surface with a perimeter contiguous to the inner surface of the sidewall, the inner surface of the sidewall and the inner surface of the bottom defining an oil receiving space, wherein the sidewall defines a drain port adjacent the inner surface of the bottom, wherein the bucket comprises a spigot mounted on the sidewall over the drain port to control the flow of oil therethrough, and wherein the inner surface of the bottom of the bucket is sloped toward the drain port, and wherein the spigot comprises a spout with a length and wherein the spigot is rotatable between a stowed position in which the spout is positioned horizontally and a discharge position in which the spout extends downwardly;

a dolly configured to rollingly support the bucket in an upright position; and a stand configured to support the bucket in an upright position a distance above the working surface.

2. The kit of claim 1 wherein the bucket further comprises a handle.

3. The kit of claim 1 wherein the bucket further comprises a lid.

4. The kit of claim 3 wherein the lid comprises a magnet positioned to support a metal tool on the lid.

5. The kit of claim 1 wherein the bucket and the dolly are configured so that, when the bucket is supported in the dolly, the bucket and dolly have a combined height of less than about sixteen (16) inches.

6. The kit of claim 1 wherein the stand, the bucket, and the spigot are cooperatively configured so that, when the stand is positioned on a working surface and the bucket is supported on the stand, the end of the spout is about twelve (12) to about fourteen (14) inches above the working surface.

7. The kit of claim 6 wherein the kit further comprises an extension tube having first and second ends, the first end sized to fit on the spout of the spigot.

8. The kit of claim 7 wherein the stand, the bucket, and the extension tube are cooperatively configured so that, when the stand is positioned on a working surface, the bucket is supported on the stand, and the first end of the extension tube is on the spout of the spigot, the second end of the extension tube is about eight (8) inches above the working surface.

9. The kit of claim 1 wherein the oil receiving space of the bucket has a capacity of at least about six (6) quarts.

10. The kit of claim 1 wherein the oil receiving space of the bucket has a capacity of at least about twelve (12) quarts.

11. The kit of claim 1 wherein the stand is collapsible.

12. The kit of claim 11 wherein the stand comprises two vertical support members that are removably attachable to each other structurally in an operating position and alternately removably attachable to each other magnetically in a storage position.

13. The kit of claim 12 wherein the vertical support members of the stand include magnets to maintain the stand in a collapsed position.

14. The kit of claim 1 further comprising a hook configured to support an oil filter inside the oil receiving space.

15. The kit of claim 14 wherein the hook is removably attachable to the sidewall of the bucket.

16. A method for collecting spent engine oil from a vehicle using the kit of claim 1 comprising:
placing the bucket on the dolly;
positioning the bucket and dolly under the vehicle; and
releasing the oil from the engine into the bucket.

17. The method of claim 16 further comprising:
placing the oil-containing bucket in the stand; and
releasing oil from the bucket into a recycling container by operating the spigot.

18. The method of claim 17, wherein the kit further comprises an extension tube having first and second ends, the first end sized to fit on the spout of the spigot, the method further comprising:
before releasing oil from the bucket into a recycling container, attaching the first end of the extension tube to the spout of the spigot.

* * * * *